US012766804B2

(12) United States Patent
Haase et al.

(10) Patent No.: US 12,766,804 B2
(45) Date of Patent: Oct. 20, 2026

(54) COMPOUND TOGGLES PLATEN DRIVE

(71) Applicant: BROWN LLC, Beaverton, MI (US)

(72) Inventors: Peter Haase, Beaverton, MI (US); Georg Nemeskeri, Beaverton, MI (US)

(73) Assignee: BROWN LLC, Beaverton, MI (US)

( * ) Notice: Subject to any disclaimer, the term of this patent is extended or adjusted under 35 U.S.C. 154(b) by 0 days.

(21) Appl. No.: 19/172,398

(22) Filed: Apr. 7, 2025

(65) Prior Publication Data

US 2025/0340030 A1 Nov. 6, 2025

Related U.S. Application Data

(60) Provisional application No. 63/642,147, filed on May 3, 2024.

(51) Int. Cl.
*B30B 1/14* (2006.01)
*B30B 1/10* (2006.01)

(52) U.S. Cl.
CPC ................ *B30B 1/106* (2013.01); *B30B 1/14* (2013.01)

(58) Field of Classification Search
CPC .................................. B30B 1/106; B30B 1/14
See application file for complete search history.

(56) References Cited

U.S. PATENT DOCUMENTS

2023/0009420 A1 * 1/2023 Bruno, Sr. ............. H02K 41/02

FOREIGN PATENT DOCUMENTS

| | | | | | |
|---|---|---|---|---|---|
| CN | 101289012 | A | | 10/2008 | |
| CN | 105500747 | A | * | 4/2016 | ............... B30B 1/06 |
| CN | 116619806 | A | | 8/2023 | |
| JP | 1994-206199 | A2 | | 7/1994 | |
| WO | WO2020096534 | A2 | | 5/2020 | |

OTHER PUBLICATIONS

Machine translation of CN-105500747-A. (Year: 2016).*
International Search Report and Written Opinion in related PCT Application PCT/US2025/027277 mailed Aug. 20, 2025, 12 pages.

* cited by examiner

*Primary Examiner* — Randell J Krug
(74) *Attorney, Agent, or Firm* — HOVEY WILLIAMS LLP

(57) ABSTRACT

A compound toggle submechanism for use with a compound toggle system to apply a force to an external object comprises a crank bar, a plurality of pull bars, a plurality of linear toggles, a plurality of coupling toggles, a plurality of three-axis toggles, a plurality of bar toggles, and an object connector. The crank bar is rigidly coupled to a drive shaft and rotates when the drive shaft rotates. Each pull bar rotates about the drive shaft. Each linear toggle moves linearly when the drive shaft rotates. Each coupling toggle rotates and moves when the drive shaft rotates. Each three-axis toggle rotates about one of multiple fixed points when the drive shaft rotates. Each bar toggle rotates about an upper opening on the respective three-axis toggle when the drive shaft rotates. The object connector connects to the external object and moves in a vertical direction when the drive shaft rotates.

20 Claims, 7 Drawing Sheets

COMPOUND TOGGLES PLATEN DRIVE

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/642,147; titled "COMPOUND TOGGLES PLATEN DRIVE"; and filed May 3, 2024. The Provisional Application is hereby incorporated by reference, in its entirety, into the current patent application.

FIELD OF THE INVENTION

Embodiments of the current invention relate to compound toggle systems for applying a large force to a platen that is used in press machines.

BACKGROUND OF THE INVENTION

A toggle mechanism includes an assembly of a plurality of components linked together to provide a mechanical advantage, that is, a first force applied to one of the components resulting in a second, larger force being delivered by another of the components. A compound toggle mechanism includes two or more stages of toggle mechanisms connected to one another to multiply the mechanical advantage provided by a single stage.

The background discussion is intended to provide information related to the present invention which is not necessarily prior art.

SUMMARY OF THE INVENTION

Embodiments of the current invention provide a compound toggle submechanism for use with a compound toggle system configured to apply a large force to an external object. One of more compound toggle systems may be used to apply a large force to one or more platens in a press machine. The compound toggle submechanism broadly comprises a crank bar, a plurality of pull bars, a plurality of linear toggles, a plurality of coupling toggles, a plurality of three-axis toggles, a plurality of bar toggles, and an object connector. The crank bar is rigidly coupled to a drive shaft of the compound toggle system and rotates when the drive shaft rotates. The pull bars are coupled to the crank bar, with a portion of each pull bar rotating about the drive shaft. The linear toggles are coupled to the pull bars, with each linear toggle moving linearly in a horizontal direction when the drive shaft rotates. The coupling toggles are coupled to the linear toggles, with each coupling toggle rotating and moving when the drive shaft rotates. The three-axis toggles are coupled to the coupling toggles, with each three-axis toggle rotating about a respective one of a plurality of fixed points when the drive shaft rotates. The bar toggles are coupled to the three-axis toggles, with each bar toggle rotating about an upper opening on the respective three-axis toggle when the drive shaft rotates. The object connector is coupled to the bar toggles, with the object connector connecting to the external object and moving in a vertical direction when the drive shaft rotates.

Another embodiment of the current invention provides a compound toggle submechanism for use with a compound toggle system configured to apply a large force to an external object. The compound toggle submechanism broadly comprises a crank bar, a left side pull bar, a right side pull bar, a left side linear toggle, a right side linear toggle, a left side coupling toggle, a right side coupling toggle, a left side three-axis toggle, a right side three-axis toggle, a left side bar toggle, a right side bar toggle, and an object connector. The crank bar is rigidly coupled to a drive shaft of the compound toggle system and rotates when the drive shaft rotates. The crank bar includes a left side lobe and a right side lobe, with each side lobe rotating about the drive shaft. The left side pull bar is coupled to the left side lobe, with a portion of the left side pull bar rotating about the drive shaft. The right side pull bar is coupled to the right side lobe, with a portion of the right side pull bar rotating about the drive shaft. The left side linear toggle is coupled to the left side pull bar, with the left side linear toggle moving linearly when the drive shaft rotates. The right side linear toggle is coupled to the right side pull bar, with the right side linear toggle moving linearly when the drive shaft rotates. The left side coupling toggle is coupled to the left side linear toggle, with the left side coupling toggle rotating and moving when the drive shaft rotates. The right side coupling toggle is coupled to the right side linear toggle, with the right side coupling toggle rotating and moving when the drive shaft rotates. The left side three-axis toggle is coupled to the left side coupling toggle, with the left side three-axis toggle rotating about a left side fixed point when the drive shaft rotates. The right side three-axis toggle is coupled to the right side coupling toggle, with the right side three-axis toggle rotating about a right side fixed point when the drive shaft rotates. The left side bar toggle is coupled to the left side three-axis toggle, with the left side bar toggle rotating about an upper opening on the left side three-axis toggle when the drive shaft rotates. The right side bar toggle is coupled to the right side three-axis toggle, with the right side bar toggle rotating about an upper opening on the right side three-axis toggle when the drive shaft rotates. The object connector is coupled to the left side bar toggle and the right side bar toggle, with the object connector configured to connect to the external object and to move in a vertical direction when the drive shaft rotates.

Yet another embodiment of the current invention provides a compound toggle submechanism for use with a compound toggle system configured to apply a large force to an external object. The compound toggle submechanism broadly comprises a crank bar, a left side pull bar, a right side pull bar, a left side linear toggle, a right side linear toggle, a left side coupling toggle, a right side coupling toggle, a left side three-axis toggle, a right side three-axis toggle, a base plate, a left side bar toggle, a right side bar toggle, and an object connector. The crank bar is rigidly coupled to a drive shaft of the compound toggle system and rotates when the drive shaft rotates. The crank bar includes a left side lobe and a right side lobe, with each side lobe rotating about the drive shaft. The left side pull bar is coupled to the left side lobe, with a portion of the left side pull bar rotating about the drive shaft and moving above or below the drive shaft. The right side pull bar is coupled to the right side lobe, with a portion of the right side pull bar rotating about the drive shaft and moving above or below the drive shaft. The left side linear toggle is coupled to the left side pull bar, with the left side linear toggle moving linearly when the drive shaft rotates. The right side linear toggle is coupled to the right side pull bar, with the right side linear toggle moving linearly when the drive shaft rotates. The left side coupling toggle is coupled to the left side linear toggle, with the left side coupling toggle rotating and moving when the drive shaft rotates. The right side coupling toggle is coupled to the right side linear toggle, with the right side coupling toggle rotating and moving when the drive shaft rotates. The left side three-axis toggle is coupled to the left side coupling toggle, with the left side three-axis toggle rotating about a left side fixed point when the drive shaft rotates. The right side three-axis toggle is coupled to the right side coupling toggle, with the right side three-axis toggle rotating about a right side fixed point when the drive shaft rotates. The base plate rigidly is coupled to a frame of the compound toggle system and includes a left side opening corresponding to the left side fixed point and a right side opening corresponding to the right side fixed point. The left side bar toggle is coupled to the left side three-axis toggle, with the left side bar toggle rotating about an upper opening on the left side three-axis toggle when the drive shaft rotates. The right side bar toggle is coupled to the right side three-axis toggle, with the right side bar toggle rotating about an upper opening on the right side three-axis toggle when the drive shaft rotates. The object connector is coupled to the left side bar toggle and the right side bar toggle, with the object connector configured to connect to the external object and to move in a vertical direction when the drive shaft rotates.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
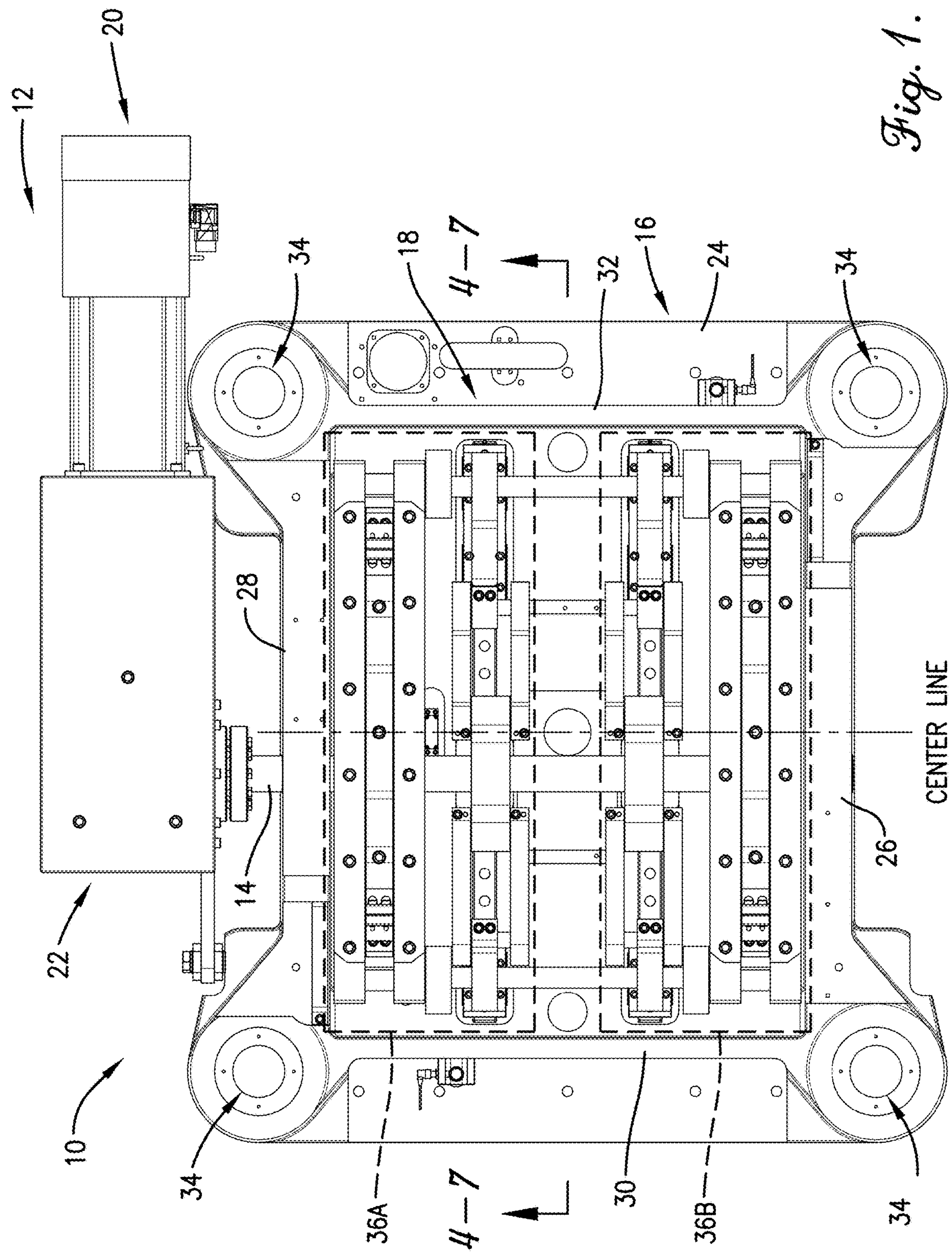
FIG. 1 is a top plan view of a compound toggle system, constructed in accordance with various embodiments of the current invention, the compound toggle system comprising a drive motor, a toggle mechanism, and a drive shaft coupling the drive motor to the toggle mechanism.
Figure 2:
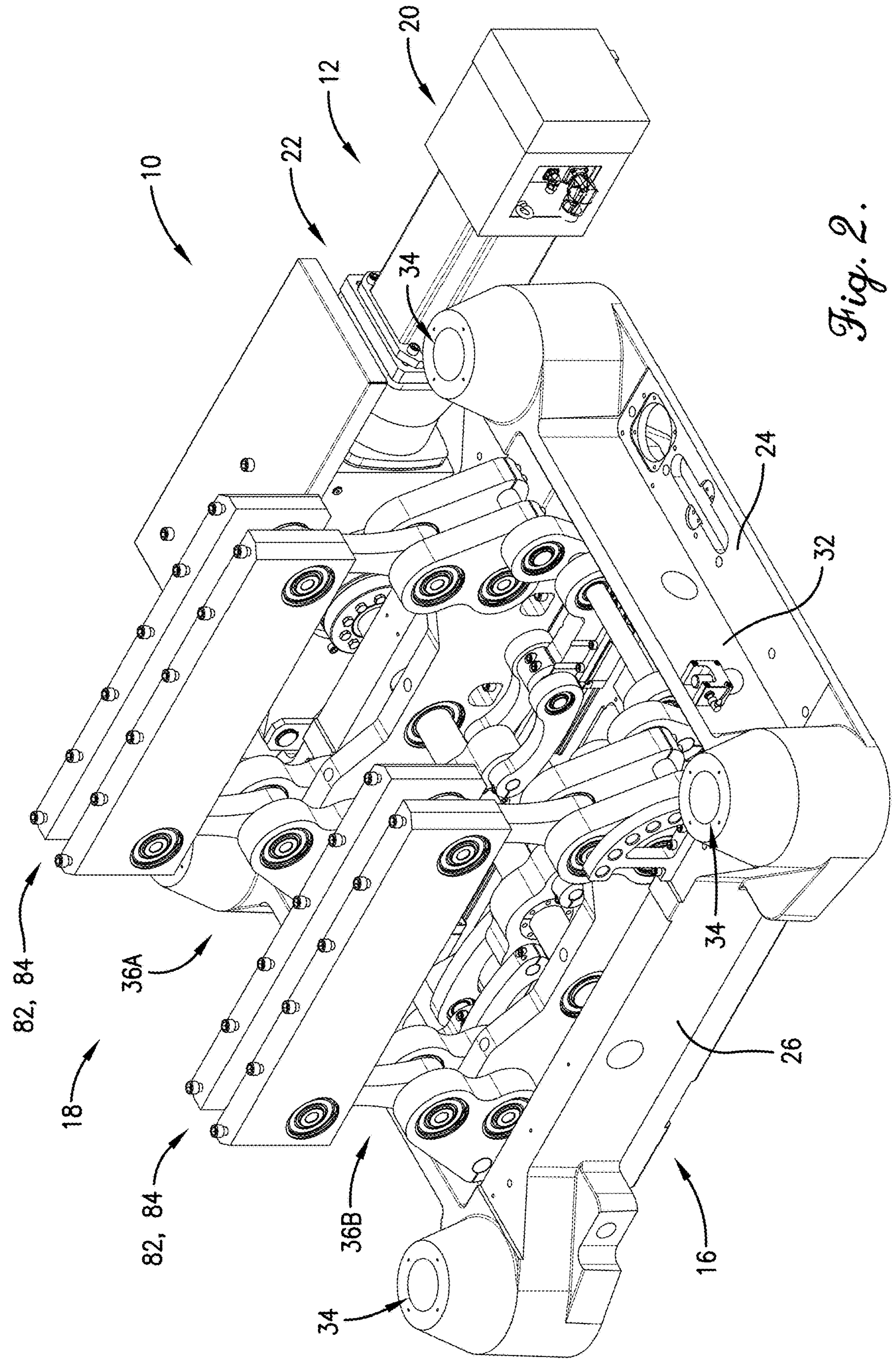
FIG. 2 is an upper isometric view of the compound toggle system from a front side of the system.
Figure 3:
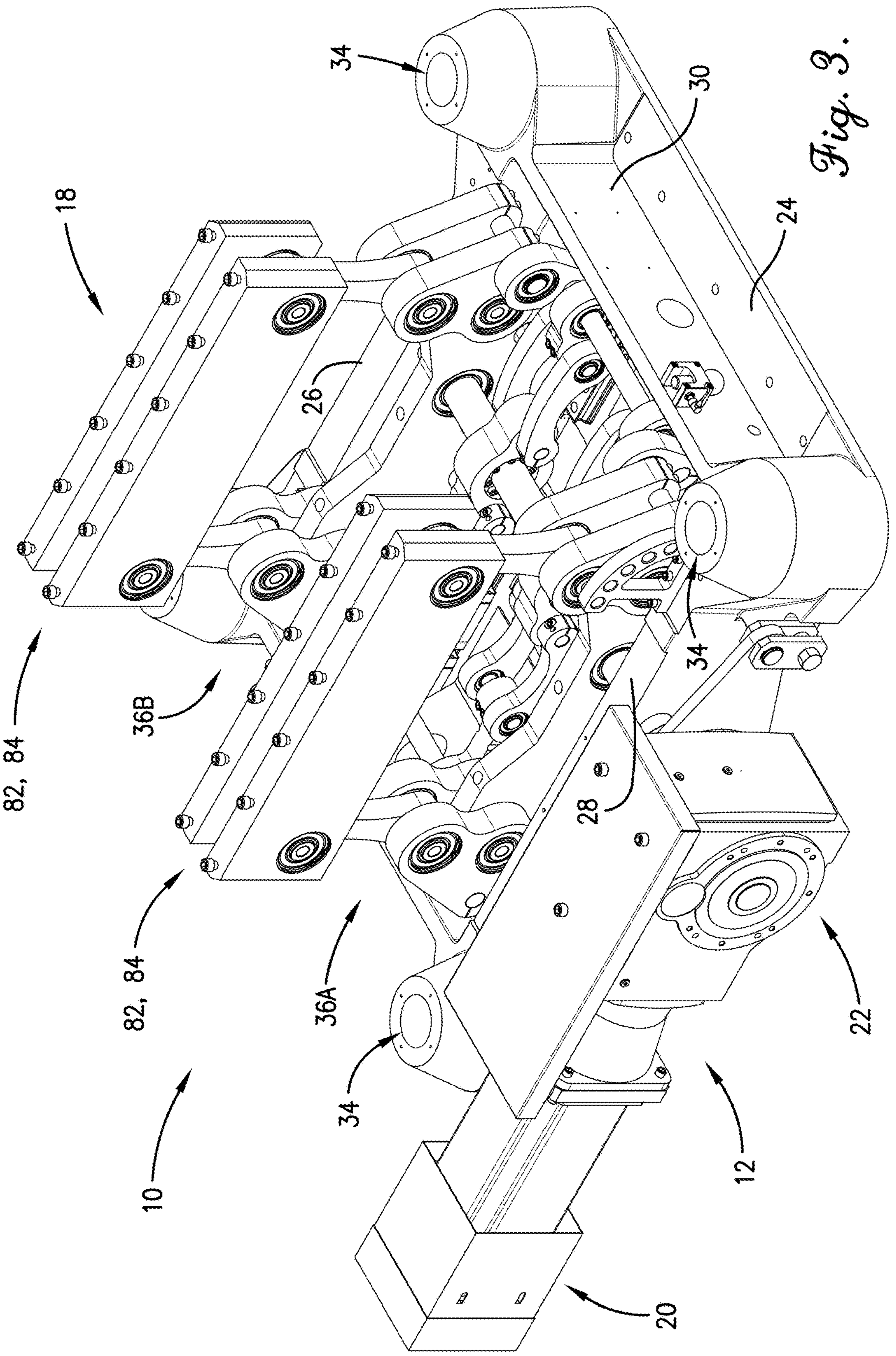
FIG. 3 is an upper isometric view of the compound toggle system from a rear side of the system.
Figure 4:
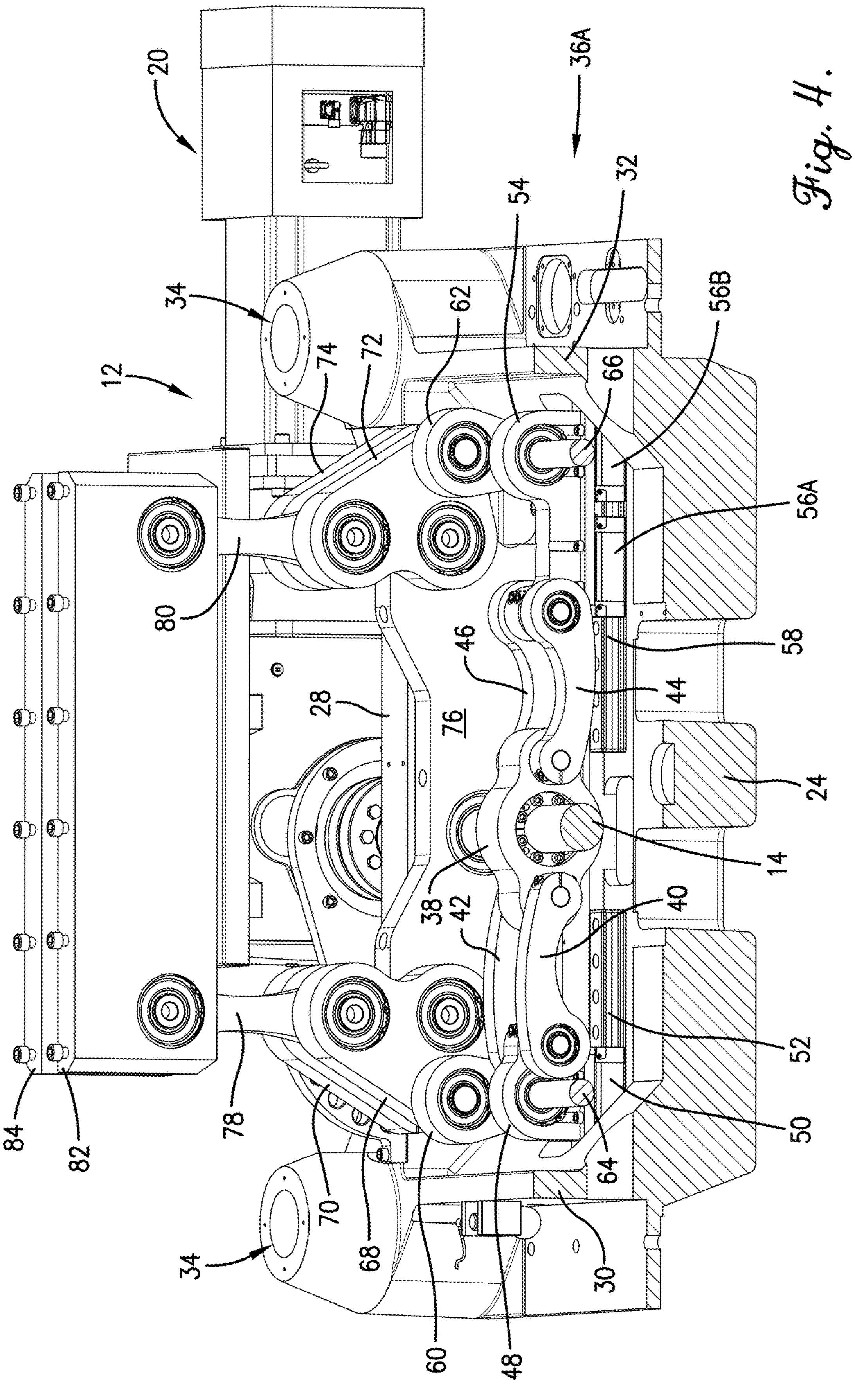
FIG. 4 is an upper perspective cross-sectional view of the compound toggle system cut along the 4-7 line of FIG. 1.
Figure 5:
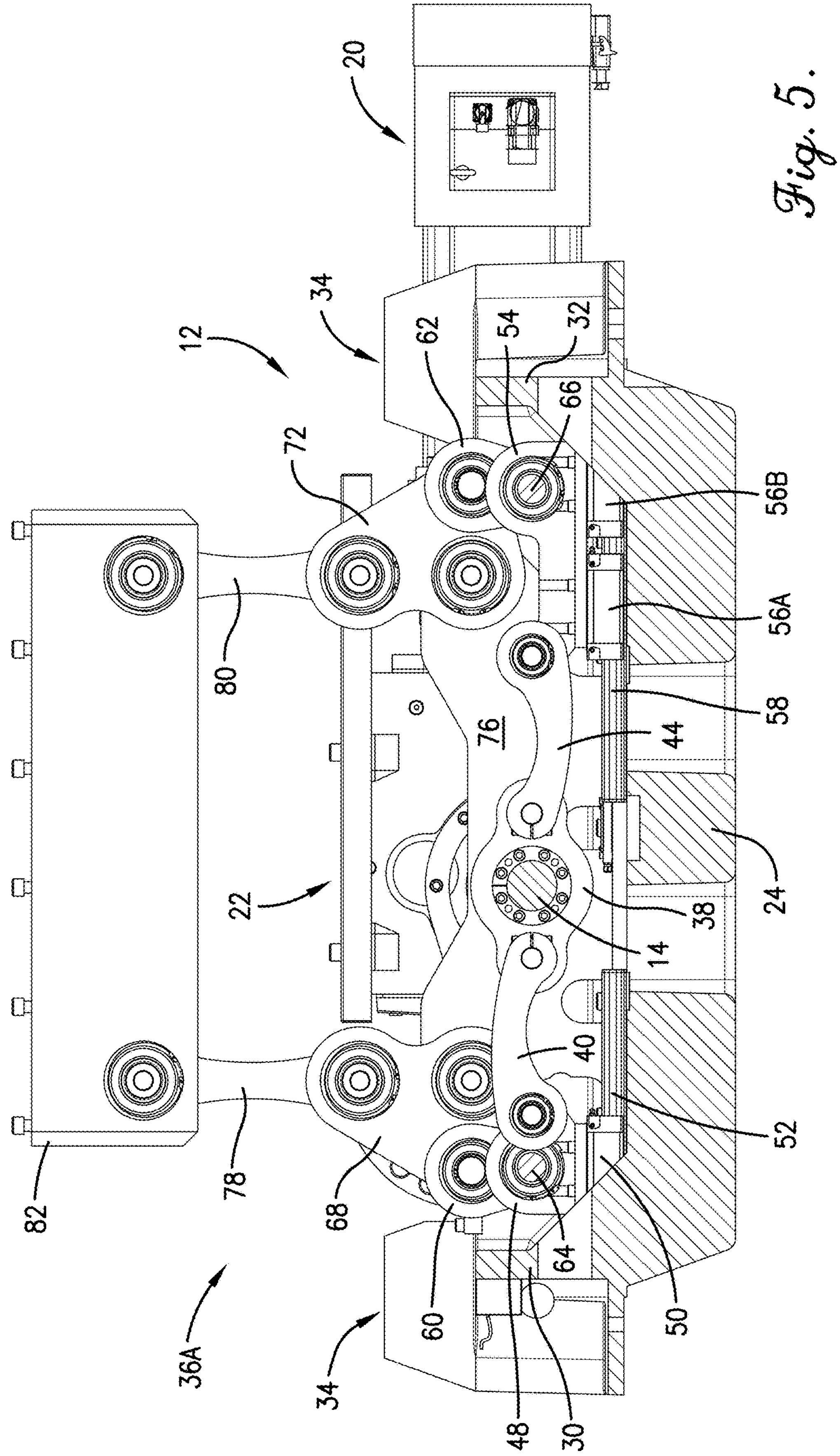
FIG. 5 is a cross-sectional view of the compound toggle system cut along the 4-7 line of FIG. 1, with the compound toggle system being in a first state of providing maximum extension of a plurality of platen connectors as a result of the drive shaft being rotated to a first rotational angle.
Figure 6:
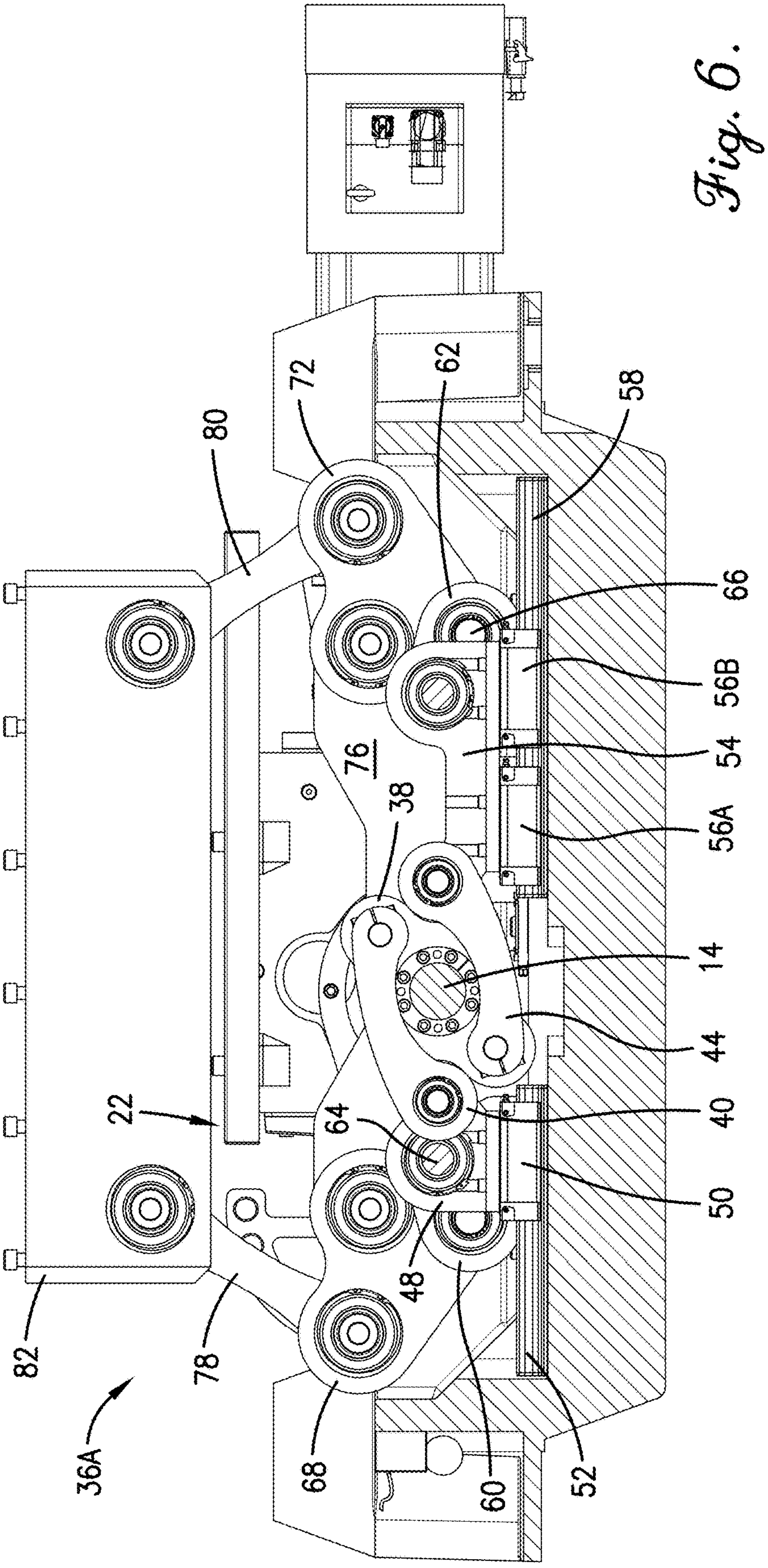
FIG. 6 is a cross-sectional view of the compound toggle system cut along the 4-7 line of FIG. 1, with the compound toggle system being in a second state of providing minimum extension of the platen connectors as a result of the drive shaft being rotated to a second rotational angle.
Figure 7:
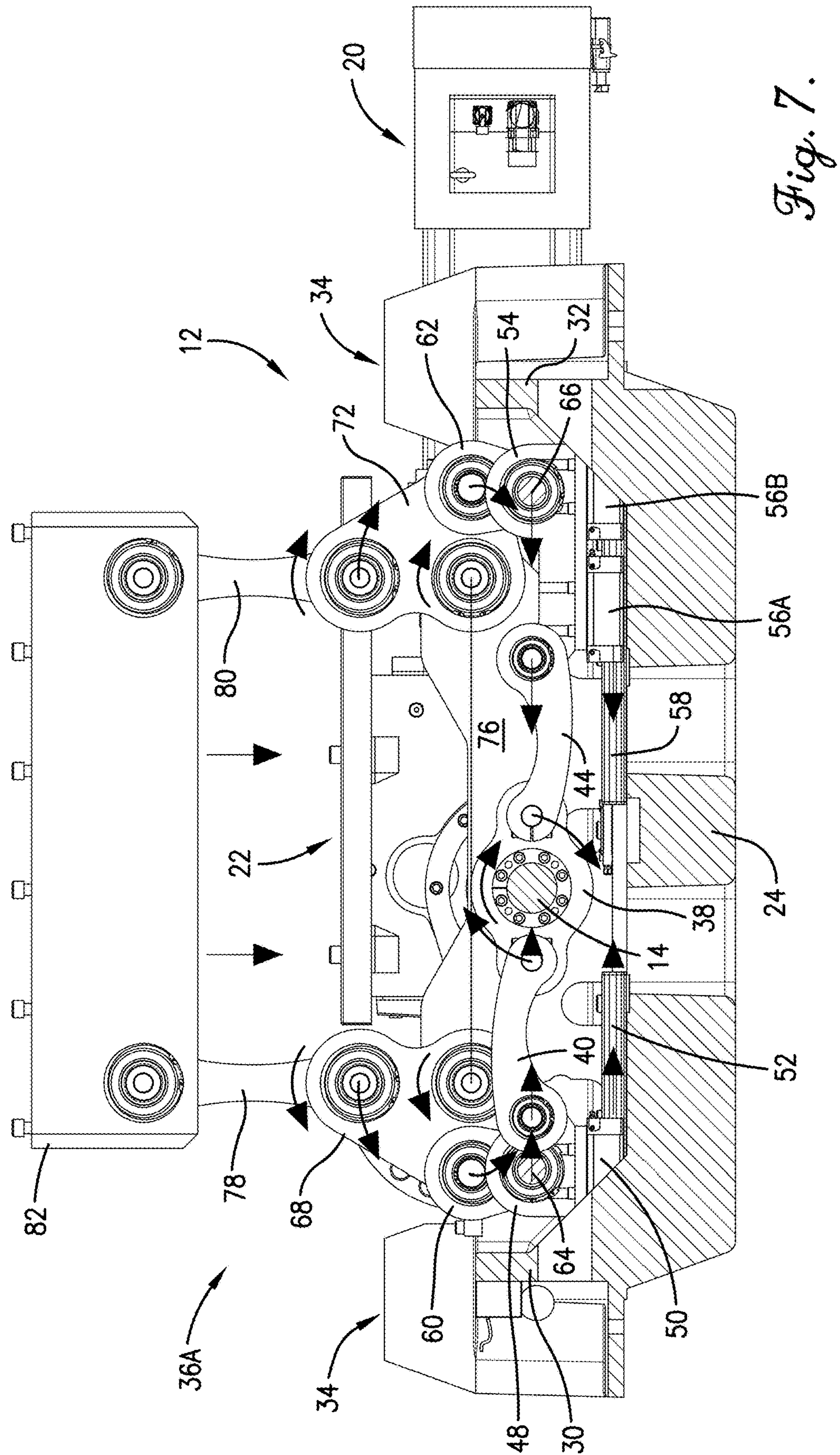
FIG. 7 is a cross-sectional view of the compound toggle system cut along the 4-7 line of FIG. 1, with the compound toggle system being in the first state, the drawing including a plurality of arrows indicating the directions in which the components move and/or rotate to transition to the second state.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "lower", "downward", "top", "bottom", "outer", "inner", "left", "right", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. However, embodiments of the technology in practice may be positioned and oriented in other ways or move in other directions. Therefore, the terms do not limit the scope of the current technology.

A compound toggle system 10, constructed in accordance with various embodiments of the current invention, is shown in FIGS. 1-7. The compound toggle system 10 broadly comprises a drive motor 12, a drive shaft 14, a frame 16, and a compound toggle mechanism 18. The compound toggle system 10 is utilized with a press machine, such as the one disclosed in U.S. patent application Ser. No. 19/069,608, which is incorporated by reference, in its entirety, into the current patent application, except where inconsistent with the teachings of the current patent application. The press machine includes an upper platen and a lower platen. The upper platen retains a top tool, and the lower platen retains a bottom tool. The upper platen and the lower platen are moved with a large force so that two tools are pressed together with paper or plastic material therebetween to form pressware products, such as plates, trays, and the like. A first compound toggle system 10 is utilized to move the lower platen, and a second compound toggle system 10, typically oriented in an inverted orientation compared to the first compound toggle system 10, is utilized to move the upper platen in order for the two tools to apply pressure to the paper or plastic material.

The drive motor 12 includes an electric motor 20 and a gearbox 22. The electric motor 20 may be embodied by any alternating current (AC) or direct current (DC) electric motor that has a first output shaft capable of rotating both directions, i.e., clockwise and counterclockwise, for a full, single revolution or less. The drive motor 12 receives electric power from an electric power source external to the compound toggle system 10. An exemplary electric motor 20 may be embodied by an AC synchronous motor. The gearbox 22 connects to the first output shaft of the electric motor 20 and includes a second output shaft coupled to two or more gears within a housing. The first output shaft may rotate along, or parallel to, a central longitudinal axis of the electric motor 20, while the second output shaft may rotate along an axis transverse to the central longitudinal axis of the electric motor 20.

The drive shaft 14 is an elongated rod that is coupled to, or is the same component as, the second output shaft of the gearbox 22. The drive shaft 14 extends outward from the housing of the gearbox 22. The drive shaft 14 is driven by the drive motor 12 to rotate to a first rotational angle shown in FIGS. 4 and 5 and a second rotational angle shown in FIG. 6.

The frame 16 retains and supports the compound toggle mechanism 18. The frame 16 includes a base 24, a front wall 26, a rear wall 28, a left side wall 30, and a right side wall 32. The base 24 has a generally quadrilateral shape with insets positioned along front and rear edges. The walls 26, 28, 30, 32 are connected to one another to form a square or rectangular shape, with each wall 26, 28, 30, 32 being attached upright to the base 24. The frame 16 further includes four vertical positioning couplers 34, with a respective one of the vertical positioning couplers 34 located at each of the four corners of the frame 16. Each vertical positioning coupler 34 has a cylindrical opening configured to couple with a respective one of four solid rods or tubes on which the frame 16 moves or slides to adjust its vertical position within the press machine.

Referring to FIG. 1, the drive shaft 14 is positioned along a line that is offset from (to the left of) a lateral (left/right) center line of the frame 16. The center line shown in FIG. 1 divides the base 24 of the frame 16 into two roughly equal areas. The compound toggle system 10 is implemented in the press machine which requires that another component (of the press machine) occupy the center location of the frame 16.

The compound toggle mechanism 18 is a central driven symmetrical toggle mechanism that provides a raising and lowering motion for the external platen to which it is connected. The compound toggle mechanism 18 further generates the force required for the tool retained by the platen to perform a pressing operation. The compound toggle mechanism 18 includes a first compound toggle submechanism 36A and a second compound toggle submechanism 36B. Each compound toggle submechanism 36 includes a crank bar 38, first and second left side pull bars 40, 42, first and second right side pull bars 44, 46, a left side linear toggle 48, a left side runner block 50, a left side linear toggle rail 52, a right side linear toggle 54, a right side runner block 56A, 56B, a right side linear toggle rail 58, a left side coupling toggle 60, a right side coupling toggle 62, a left side coupling shaft 64, a right side coupling shaft 66, first and second left side three-axis toggles 68, 70, first and second right side three-axis toggles 72, 74, a base plate 76, a left side bar toggle 78, a right side bar toggle 80, and first and second platen connectors 82, 84. The components of each compound toggle mechanism 18 are described below using relational and/or directional terms with reference to FIGS. 4-7. Each of the components named "left side" are positioned on a left side of the drive shaft 14, and each of the components named "right side" are positioned on a right side of the drive shaft 14.

The crank bar 38 includes a body that has a generally oval or elliptical disc shape with a front surface, a spaced-apart rear surface, and a side surface positioned therebetween and connected to the front surface and the rear surface. The body includes a generally circular central portion, a left side lobe coupled to a left side of the central portion, and a right side lobe coupled to a right side of the central portion. The crank bar 38 further includes a central opening, a left side opening, and a right side opening, with each opening extending from the front surface to the rear surface. The central opening is positioned in the central portion and is rigidly coupled to the drive shaft 14. The left side opening is positioned in the left side lobe and is rotatably coupled to a first pin. The right side opening is positioned in the right side lobe and is rotatably coupled to a second pin. Each pin may rotate within the respective openings. The crank bar 38 rotates about the central opening and the drive shaft 14.

The first and second left side pull bars 40, 42 each have the same structure, including a body having an elongated comma shape with a front surface, a spaced-apart rear surface, and a side surface positioned therebetween and connected to the front surface and the rear surface. The first and second left side pull bars 40, 42 each also have a left side opening and a right side opening, each extending from the front surface to the rear surface. The side surface has a convex portion along a first edge and a concave portion along a second, opposing edge. The first and second left side pull bars 40, 42 are oriented in the compound toggle mechanism 18 such that the convex portion of the side surface faces upward, and the concave portion of the side surface faces downward. The first left side pull bar 40 is spaced apart from, and roughly in parallel with, the second left side pull bar 42 such that the side surface of the first left side pull bar 40 is aligned with the side surface of the second left side pull bar 42. The rear surface of the first left side pull bar 40 is aligned with the front surface of the crank bar 38 and the front surface of the second left side pull bar 42 is aligned with the rear surface of the crank bar 38. The right side opening of each of the first and second left side pull bars 40, 42 is rigidly coupled to the first pin which is rotatably coupled to the crank bar 38. The left side opening of each of the first and second left side pull bars 40, 42 is rotatably coupled to a third pin, so that the third pin rotates within the left side opening. The first and second left side pull bars 40, 42 each rotate about the left side opening and the third pin. In addition, the first and second left side pull bars 40, 42 move or translate to the right or toward the drive shaft 14. The first and second left side pull bars 40, 42 convert the rotational motion of the drive shaft 14 into linear/translational motion for the left side linear toggle 48.

The first and second right side pull bars 44, 46 each have a structure that is the same as, or substantially similar to, the structure of the first and second left side pull bars 40, 42. The first and second right side pull bars 44, 46 are oriented in the compound toggle mechanism 18 such that the convex portion of the side surface faces downward, and the concave portion of the side surface faces upward. The first right side pull bar 44 is spaced apart from, and roughly in parallel with, the second right side pull bar 46 such that the side surface of the first right side pull bar 44 is aligned with the side surface of the second right side pull bar 46. A rear surface of the first right side pull bar 44 is aligned with the front surface of the crank bar 38 and a front surface of the second right side pull bar 46 is aligned with the rear surface of the crank bar 38. The left side opening of each of the first and second right side pull bars 44, 46 is rigidly coupled to the first pin which is rotatably coupled to the crank bar 38. The right side opening of each of the first and second right side pull bars 44, 46 is rotatably coupled to a fourth pin, so that the fourth pin rotates within the right side opening. The first and second right side pull bars 44, 46 each rotate about the right side opening and the fourth pin. The first and second right side pull bars 44, 46 convert the rotational motion of the drive shaft 14 into linear/translational motion for the right side linear toggle 54.

The first and second left side pull bars 40, 42 and the first and second right side pull bars 44, 46 are aligned with each other lengthwise and with the drive shaft 14 when the drive shaft 14 is at the first rotational angle. When the drive shaft 14 is at the first rotational angle, a portion the first and second left side pull bars 40, 42 is positioned above the drive shaft 14, and a portion the first and second right side pull bars 44, 46 is positioned below the drive shaft 14

The left side linear toggle 48 includes a body having a front surface, a spaced-apart rear surface, and an upper surface and a lower surface coupled to one another, with each positioned between the front surface and the rear surface and connected thereto. The upper surface has a generally arcuate shape, and the lower surface has a generally planar shape. The left side linear toggle 48 further includes a left side opening and a right side opening, each extending from the front surface to the rear surface. The left side opening is rotatably coupled to the left side coupling shaft 64, such that the left side coupling shaft 64 rotates within the left side opening. The right side opening is rigidly coupled to the third pin which is coupled to the first and second left side pull bars 40, 42. In addition, the lower surface is connected to the left side runner block 50.

The left side runner block 50 includes a top wall and spaced apart front and rear walls, each connected to the top wall and extending downward therefrom. An upper surface of the top wall is connected to the lower surface of the left side linear toggle 48. The front and rear walls each include an interior surface having features, such as a protrusion, that couple or mate with the left side linear toggle rail 52 such that the left side runner block 50 and the left side linear toggle 48, as a unit, slide linearly back and forth along the left side linear toggle rail 52—that is, toward and away from the drive shaft 14.

The left side linear toggle rail 52 has an elongated body with a top surface, a bottom surface, a front surface, and a rear surface. The bottom surface is connected to an upper surface of the base 24. The front surface and the rear surface each include features, such as an indention, that are complementary to, and mate with, features on the interior surfaces of the front and rear walls, respectively, of the left side runner block 50. The left side linear toggle rail 52 is positioned on the base 24 such that a length, or longitudinal axis, extends laterally along the surface of the base 24.

The right side linear toggle 54 has a structure including a front surface, a rear surface, and an upper surface and a lower surface that are each similar to the structural components of the left side linear toggle 48, although the right side linear toggle 54 has a length that is greater than a length of the left side linear toggle 48—as a result of the drive shaft 14 being located to the left of the center line of the frame 16. In addition, the left side opening and the right side opening of the right side linear toggle 54 are spaced farther apart than are the left side opening and the right side opening of the left side linear toggle 48. The left side opening is rigidly coupled to the fourth pin which is coupled to the first and second right side pull bars 44, 46. The right side opening is rotatably coupled to the right side coupling shaft 66, such that the right side coupling shaft 66 rotates within the right side opening. In addition, the lower surface is connected to the left side runner block 50.

The right side runner block includes a first right side runner block 56A and a second right side runner block 56B in exemplary embodiments, as shown in the figures. Alternatively, the right side runner block may be just a single component. Each of the first and second right side runner blocks 56A, 56B has a structure including a top wall and spaced apart front and rear walls that are each similar to the structural components of the left side runner block 50. The first right side runner block 56A is aligned along a longitudinal axis with the second right side runner block 56B. An upper surface of the top wall of each of the first and second right side runner blocks 56A, 56B is connected to the lower surface of the left side linear toggle 48. The front and rear walls of the first and second right side runner blocks 56A, 56B each include an interior surface having features, such as a protrusion, that couple or mate with the left side linear toggle rail 52 such that the first and second right side runner blocks 56A, 56B and the right side linear toggle 54, as a unit, slide linearly back and forth along the right side linear toggle rail 58—that is, toward and away from the drive shaft 14.

The right side linear toggle rail 58 is similar in structure to the left side linear toggle rail 52 with an elongated body with a top surface, a bottom surface, a front surface, and a rear surface, although the right side linear toggle rail 58 has a length that is greater than a length of the left side linear toggle rail 52—as a result of the drive shaft 14 being located to the left of the center line of the frame 16. The bottom surface is connected to an upper surface of the base 24. The front surface and the rear surface each include features, such as an indention, that are complementary to, and mate with, features on the interior surfaces of the front and rear walls, respectively, of the first and second right side runner blocks 56A, 56B. The right side linear toggle rail 58 is positioned on the base 24 such that a length, or longitudinal axis, extends laterally along the surface of the base 24.

The left side coupling toggle 60 includes a body having a front surface, a spaced-apart rear surface, and a side surface positioned therebetween and coupled thereto. The left side coupling toggle 60 also includes an upper opening and a lower opening, each extending from the front surface to the rear surface. The upper opening is rotatably coupled to a fifth pin, such that the fifth pin rotates within the upper opening. The lower opening is rigidly coupled to the left side coupling shaft 64 which is coupled to the left side linear toggle 48. The left side coupling toggle 60 rotates about the upper opening and the fifth pin. The left side coupling toggle 60 also moves left and right or toward and away from the drive shaft 14 as the left side linear toggle 48 moves. The left side coupling toggle 60 converts the linear/translational motion of the left side linear toggle 48 into rotational motion for the left side three-axis toggles 68, 70 when the drive shaft 14 rotates.

The right side coupling toggle 62 includes body having a front surface, a rear surface, a side surface, an upper opening, and a lower opening with a structure that is the same as, or substantially similar to, the left side coupling toggle 60. The upper opening is rotatably coupled to a sixth pin, such that the sixth pin rotates within the upper opening. The lower opening is rigidly coupled to the right side coupling shaft 66 which is coupled to the right side linear toggle 54. The right side coupling toggle 62 rotates about the upper opening and the sixth pin. The right side coupling toggle 62 also moves left and right or toward and away from the drive shaft 14 as the right side linear toggle 54 moves. The right side coupling toggle 62 converts the linear/translational motion of the right side linear toggle 54 into rotational motion for the right side three-axis toggles 72, 74 when the drive shaft 14 rotates.

The left side coupling shaft 64 is an elongated rod that is rigidly coupled to the lower opening of the left side coupling toggle 60 and rotatably coupled to the left side opening of the left side linear toggle 48 so that the left side coupling shaft 64 rotates within the left side opening.

The right side coupling shaft 66 is an elongated rod that is rigidly coupled to the lower opening of the right side coupling toggle 62 and rotatably coupled to the right side opening of the right side linear toggle 54 so that the right side coupling shaft 66 rotates within the right side opening.

The first and second left side three-axis toggles 68, 70 each have the same structure, including a body having a roughly triangular shape with a front surface, a spaced-apart rear surface, a left side surface, a right side surface, and a lower surface. The side surfaces and the lower surface are positioned between the front and rear surfaces and connected thereto. The first and second left side three-axis toggles 68, 70 each also have an upper opening, a lower left side opening, and a lower right side opening, each extending from the front surface to the rear surface. The first left side three-axis toggle 68 is spaced apart from, and roughly in parallel with, the second left side three-axis toggle 70 such that the side surfaces and the lower surface of the first left side three-axis toggle 68 is aligned with the side surfaces and the lower surface of the second left side three-axis toggle 70. The rear surface of the first left side three-axis toggle 68 is aligned with a front surface of the base plate 76 and the front surface of the second left side three-axis toggle 70 is aligned with a rear surface of the base plate 76. The upper opening is rotatably coupled to a sixth pin, so that the sixth pin rotates within the upper opening. The lower left side opening is rigidly coupled to the fifth pin which is coupled to the left side coupling toggle 60. The lower right side opening is rotatably coupled to a seventh pin, so that the seventh pin rotates within the lower right side opening. The first and second left side three-axis toggles 68, 70 each rotate about the lower right side opening and the seventh pin.

The first and second right side three-axis toggles 72, 74 each have the same structure, including a body having a roughly triangular shape with a front surface, a spaced-apart rear surface, a left side surface, a right side surface, and a lower surface. The side surfaces and the lower surface are positioned between the front and rear surfaces and connected thereto. The first and second right side three-axis toggles 72, 74 each also have an upper opening, a lower left side opening, and a lower right side opening, each extending from the front surface to the rear surface. The first and second right side three-axis toggles 72, 74 are oriented to mirror the first and second left side three-axis toggles 68, 70, wherein the first right side three-axis toggle 72 is spaced apart from, and roughly in parallel with, the second right side three-axis toggle 74 such that the side surfaces and the lower surface of the first right side three-axis toggle 72 is aligned with the side surfaces and the lower surface of the second right side three-axis toggle 74. The rear surface of the first right side three-axis toggle 72 is aligned with the front surface of the base plate 76 and the front surface of the second right side three-axis toggle 74 is aligned with the rear surface of the base plate 76. The upper opening is rotatably coupled to an eighth pin, so that the eighth pin rotates within the upper opening. The lower left side opening is rotatably coupled to a ninth pin, so that the ninth pin rotates within the lower left side opening. The lower right side opening is rigidly coupled to the sixth pin which is coupled to the right side coupling toggle 62. The first and second right side three-axis toggles 72, 74 each rotate about the lower left side opening and the ninth pin.

The base plate 76 includes a body having an irregular shape with a front surface, a spaced-apart rear surface, multiple side surfaces, and a lower surface. The side surfaces and the lower surface are positioned between the front and rear surfaces and connected thereto. The base plate 76 also includes a central opening, a left side opening, and a right side opening, each extending from the front surface to the rear surface. The drive shaft 14 passes through the central opening and rotates within the central opening. The left side opening is rigidly coupled to the fifth pin which is rotatably coupled to the first and second left side three-axis toggles 68, 70. The right side opening is rigidly coupled to the sixth pin which is rotatably coupled to the first and second right side three-axis toggles 72, 74. The base plate 76 is connected to the upper surface of the base 24 of the frame 16.

The left side bar toggle 78 includes a body having an elongated roughly rectangular shape with a front surface, a spaced-apart rear surface, a left side surface, and a right side surface. The side surfaces are positioned between the front and rear surfaces and connected thereto. The left side bar toggle 78 also includes an upper opening and a lower opening, each extending from the front surface to the rear surface. A lower portion of the left side bar toggle 78, including the lower opening, is positioned between the first and second left side three-axis toggles 68, 70. An upper portion of the left side bar toggle 78, including the upper opening, is positioned between the first and second platen connectors 82, 84. The upper opening is rigidly coupled to a tenth pin which is rotatably coupled to the first and second platen connectors 82, 84. The lower opening is rigidly coupled to the sixth pin which is rotatably coupled to the first and second left side three-axis toggles 68, 70. The left side bar toggle 78 rotates about the upper opening, the tenth pin, the lower opening, and the sixth pin. The left side bar toggle 78 has a lengthwise vertical orientation when the drive shaft 14 is rotated to the first rotational angle. In addition, the upper and lower openings of the left side bar toggle 78, the sixth pin, the tenth pin, the lower right opening of the first and second left side three-axis toggles 68, 70, and the seventh pin are all in alignment (positioned in a line) when the drive shaft 14 is rotated to the first rotational angle.

The right side bar toggle 80 includes a body having a front surface, a rear surface, a left side surface, a right side surface, an upper opening, and a lower opening with a structure that is the same as, or substantially similar to, a structure of the left side bar toggle 78. A lower portion of the right side bar toggle 80, including the lower opening, is positioned between the first and second right side three-axis toggles 72, 74. An upper portion of the right side bar toggle 80, including the upper opening, is positioned between the first and second platen connectors 82, 84. The upper opening is rigidly coupled to an eleventh pin which is rotatably coupled to the first and second platen connectors 82, 84. The lower opening is rigidly coupled to the eighth pin which is rotatably coupled to the first and second right side three-axis toggles 72, 74. The right side bar toggle 80 rotates about the upper opening, the eleventh pin, the lower opening, and the eighth pin. The right side bar toggle 80 has a lengthwise vertical orientation when the drive shaft 14 is rotated to the first rotational angle. In addition, the upper and lower openings of the right side bar toggle 80, the eighth pin, the eleventh pin, the lower left opening of the first and second right side three-axis toggles 72, 74, and the ninth pin are all in alignment (positioned in a line) when the drive shaft 14 is rotated to the first rotational angle.

The first and second platen connectors 82, 84 each include a body having a front surface, a rear surface, a left side surface, a right side surface, a top surface, and a bottom surface connected to one another to form a generally rectangular cuboid. The top surface of each of the first and second platen connectors 82, 84 connects to the platen of an external press machine, or similar equipment. The top surface may include a plurality of openings configured to receive fasteners, such as bolts, screws, or the like. The first and second platen connectors 82, 84 each also include a left side opening and a right side opening. The left side opening is rotatably coupled to the tenth pin, such that the tenth pin rotates within the left side opening. Thus, the left side bar toggle 78 rotates about the left side opening of the first and second platen connectors 82, 84. The right side opening is rotatably coupled to the eleventh pin, such that the eleventh pin rotates within the right side opening. Thus, the right side bar toggle 80 rotates about the right side opening of the first and second platen connectors 82, 84. The first and second platen connectors 82, 84 are positioned spaced apart from one another and oriented vertically such that upper portions of the left side bar toggle 78 and the right side bar toggle 80 are positioned therebetween. The first and second platen connectors 82, 84 move or translate linearly up and down.

Referring to FIG. 1, the first compound toggle submechanism 36A is positioned in a forward portion of the frame 16, and the second compound toggle submechanism 36B is positioned in a rear portion of the frame 16, with some space between the two submechanisms 36. The drive shaft 14 is rigidly coupled to the crank bars 38 of both the first compound toggle submechanism 36A and the second compound toggle submechanism 36B. In addition, the drive shaft 14 passes through the base plates 76 of both the first compound toggle submechanism 36A and the second compound toggle submechanism 36B. The left side coupling shaft 64 is rigidly coupled to the left side coupling toggles 60 of both the first compound toggle submechanism 36A and the second compound toggle submechanism 36B. The left side coupling shaft 64 is rotatably coupled to the left side linear toggles 48 of both the first compound toggle submechanism 36A and the second compound toggle submechanism 36B. The right side coupling shaft 66 is rigidly coupled to the right side coupling toggles 62 of both the first compound toggle submechanism 36A and the second compound toggle submechanism 36B. The right side coupling shaft 66 is rotatably coupled to the right side linear toggles 54 of both the first compound toggle submechanism 36A and the second compound toggle submechanism 36B.

The compound toggle system 10 may operate as follows. Typically, the compound toggle system 10 transitions back and forth between a first state in which the first and second platen connectors 82, 84 are positioned at a first vertical height and a second state in which the first and second platen connectors 82, 84 are positioned at a second vertical height. The first vertical height is reached during a maximum extension of the first and second platen connectors 82, 84. The second vertical height is reached during a minimum extension of the first and second platen connectors 82, 84. It is possible that the compound toggle system 10 may operate in a state in between the first state and the second state, wherein the first and second platen connectors 82, 84 are positioned between the minimum extension and the maximum extension. The state of the compound toggle system 10 varies according to, or is determined by, the rotational angle of the drive shaft 14. In the first state, the rotational angle of the drive shaft 14 has a first value. In the second state, the rotational angle of the drive shaft 14 has a second value. It is possible that the first value and the second value may vary, but the difference between the first value and the second value is typically approximately 135 degrees. The rotational angle of the drive shaft 14 is varied by the drive motor 12, whose operation is controlled by a computing device external to the compound toggle system 10.

The compound toggle system 10 is shown in the first state in FIGS. 2-5. The compound toggle system 10 is shown in the second state in FIG. 6. To transition from the first state to the second state, the drive motor 12 receives an electronic signal to cause it to rotate the drive shaft 14 from its first rotational angle clockwise to its second rotational angle. In each compound toggle submechanism 36, the following events occur with reference to FIG. 7. The crank bar 38 rotates clockwise to the second rotational angle, pulling the right side opening of the first and second left side pull bars 40, 42 upward and pulling the left side opening of the first and second right side pull bars 44, 46 downward, such that the concave portion of the first and second left side pull bars 40, 42 moves and then is positioned adjacent to, and rests above, the drive shaft 14, and the concave portion of the first and second right side pull bars 44, 46 moves and then is positioned adjacent to, and rests below, the drive shaft 14. The left side opening of the first and second left side pull bars 40, 42, the left side linear toggle 48, the left side runner block 50, and the left side coupling shaft 64 each are pulled and move to the right, with the left side linear toggle 48 and the left side runner block 50 sliding linearly to the right along the left side linear toggle rail 52. The right side opening of the first and second right side pull bars 44, 46, the right side linear toggle 54, the right side runner block 56, and the right side coupling shaft 66 each are pulled and move to the left, with the right side linear toggle 54 and the right side runner block 56 sliding linearly to the left along the right side linear toggle rail 58.

The left side coupling toggle 60 is also pulled downward and to the right and rotates counterclockwise about its upper opening and the fifth pin. The pulling of the left side coupling toggle 60 downward and rightward also pulls on the first and second left side three-axis toggles 68, 70, which rotates the first and second left side three-axis toggles 68, 70 counterclockwise about a left side fixed point—the lower right side opening and the seventh pin. The left side coupling toggle 60 also rotates about the left side fixed point. The right side coupling toggle 62 is pulled downward and to the left and rotates clockwise about its upper opening and the sixth pin. The pulling of the right side coupling toggle 62 downward and leftward also pulls on the first and second right side three-axis toggles 72, 74, which rotates the first and second right side three-axis toggles 72, 74 clockwise about a right side fixed point—the lower left side opening and the ninth pin. The right side coupling toggle 62 also rotates about the right side fixed point. The rotation of the first and second left side three-axis toggles 68, 70 counterclockwise rotates the lower portion of the left side bar toggle 78 about the left side fixed point and pulls the lower portion of the left side bar toggle 78 downward and leftward (away from the center). The rotation of the first and second right side three-axis toggles 72, 74 clockwise rotates the lower portion of the right side bar toggle 80 about the right side fixed point and pulls the lower portion of the right side bar toggle 80 downward and rightward (away from the center). With the two bar toggles 78, 80 being pulled outward from the center, the first and second platen connectors 82, 84 move or translate downward to their second vertical height, which puts the compound toggle system 10 in its second state.

To transition from the second state back to the first state, the drive shaft 14 is rotated counterclockwise to its first rotational angle. The events described above are repeated with the components moving and/or rotating in opposite directions from those described.

The compound toggle system 10 of the current technology is a type of central driven symmetrical toggle system. That is, the forces providing pressure for the platens (in the press machine in which the compound toggle system 10 is utilized) are symmetrical, balanced, or equivalent, laterally across the center line of the system 10, as shown in FIG. 1. The system 10 also provides uniform vertical motion of the toggle bars 78, 80 on both sides of the platen connectors 82, 84. This balance is at least partly the result of symmetrical positioning of the components of the compound toggle mechanism 18 on both sides of the center line. However, the drive shaft 14 (being driven by the drive motor 12 and providing drive for the compound toggle mechanism 18) is not positioned along the center line. As mentioned previously, a component of the press machine is required to occupy a position along the center line in the center of the frame 16—resulting in the drive shaft 14 being positioned offset (to the left) from the center line, which creates asymmetrical positioning of a key component of the compound toggle mechanism 18 and could lead to difficulty in providing uniform vertical motion of the platen connectors 82, 84. The compound toggle mechanism 18 includes a plurality of toggles on each side of the center line that rotate in order to provide the vertical motion of the platen connectors 82, 84. It may be possible to overcome the challenges that the offset positioning of the drive shaft 14 presents to providing uniform vertical motion of the platen connectors 82, 84 by having one or more of the toggles on one side of the center line rotate to angles which are different from the angles to which the toggles on the other side of the center line rotate. However, it may be difficult to design and implement toggles which have nonuniform rotation on opposite sides of the center line and which operate reliably.

In the compound toggle mechanism 18 of the current technology, the toggles on each side of the center line operate uniformly and rotate to the same angles. To overcome the challenges of the offset positioning of the drive shaft 14, the compound toggle mechanism 18 includes left side linear toggles 48 and right side linear toggles 54 which move on toggle rails 52, 58, respectively, with linear motion as part of the operation which leads to uniform vertical motion of the platen connectors 82, 84. While the linear toggles 48, 54 are positioned on the opposing sides equidistant from the center line, the linear toggles 48, 54 are of different sizes and the toggles rails 52, 58 are of different lengths to compensate for the offset position of the drive shaft 14. Specifically, the left side linear toggle 48 is shorter than the right side linear toggle 54, and the left side linear toggle rail 52 is shorter than the right side linear toggle rail 58. The dimensions of the remaining left side components are roughly equal to the dimensions of the corresponding right side components. As a result, a distance that the left side linear toggle 48 travels along the left side linear toggle rail 52 is roughly equal to a distance that the right side linear toggle 54 travels along the right side linear toggle rail 58.

The compound toggle mechanism 18 of the current technology also has a multi-stage mechanical multiplication or advantage. Specifically, the compound toggle mechanism 18 has a three-stage mechanical multiplication wherein the torque generated by rotation of the drive shaft 14 is multiplied by the stages to generate a very high clamping force by the platen connectors 82, 84. The first stage exists in the horizontal plane and includes the drive shaft 14 rotating and pulling on the pull bars 40, 42, 44, 46 which in turn pulls on the linear toggles 48, 54 to generate horizontal linear motion. The second stage has vertical motion and includes the coupling toggles 60, 62 which are pulled by the linear toggles 48, 54 and rotate about a separate point in the vertical plane. The third stage also has vertical motion and includes the three-axis toggles 68, 70, 72, 74 being pulled and rotated by the coupling toggles 60, 62. The third stage also includes the bar toggles 78, 80 that are pushed by the rotation of the three-axis toggles 68, 70, 72, 74 until the bar toggles 78, 80 are in a vertical orientation, which results in the maximum clamping force of the platen connectors 82, 84. Various embodiments of the compound toggle mechanism 18 may provide 150 tons of clamping force, although alternative embodiments of the compound toggle mechanism 18 may provide a larger clamping force or a smaller clamping force.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A compound toggle submechanism for use with a compound toggle system to apply a force to an external object, the compound toggle submechanism comprising:

a crank bar rigidly coupled to a drive shaft of the compound toggle system and configured to rotate when the drive shaft rotates;

a plurality of pull bars coupled to the crank bar, a portion of each pull bar configured to rotate about the drive shaft;

a plurality of linear toggles coupled to the pull bars, each linear toggle configured to move linearly in a horizontal direction when the drive shaft rotates;

a plurality of coupling toggles coupled to the linear toggles, each coupling toggle configured to rotate and move when the drive shaft rotates;

a plurality of three-axis toggles coupled to the coupling toggles, each three-axis toggle configured to rotate about a respective one of a plurality of fixed points when the drive shaft rotates;

a plurality of bar toggles coupled to the three-axis toggles, each bar toggle configured to rotate about an upper opening on the respective three-axis toggle when the drive shaft rotates; and an object connector coupled to the bar toggles, the object connector configured to connect to the external object and to move in a vertical direction when the drive shaft rotates.

2. The compound toggle submechanism of claim 1, wherein the crank bar includes a left side lobe and a right side lobe, each side lobe configured to rotate about the drive shaft, and the pull bars include a left side pull bar coupled to the left side lobe and a right side pull bar coupled to the right side lobe such that a portion of one of the left side pull bar or the right side pull bar is configured to move above the drive shaft when the drive shaft rotates and a portion of the other of the left side pull bar or the right side pull bar is configured to move below the drive shaft when the drive shaft rotates.

3. The compound toggle submechanism of claim 2, wherein the left side pull bar includes a first concave portion and the right side pull bar includes a second concave portion and the first concave portion and the second concave portion are each positioned adjacent to the drive shaft when the drive shaft rotates in a first direction.

4. The compound toggle submechanism of claim 1, wherein the linear toggles include a left side linear toggle coupled to a left side pull bar, the left side linear toggle configured to slide on a left side linear toggle rail when the drive shaft rotates, and a right side linear toggle coupled to a right side pull bar, the right side linear toggle configured to slide on a right side linear toggle rail when the drive shaft rotates.

5. The compound toggle submechanism of claim 1, wherein the coupling toggles include a left side coupling toggle coupling a left side linear toggle to a left side three-axis toggle, the left side coupling toggle configured to convert the linear motion of the left side linear toggle into rotational motion for the left side three-axis toggle, and a right side coupling toggle coupling a right side linear toggle to a right side three-axis toggle, the right side coupling toggle configured to convert the linear motion of the right side linear toggle into rotational motion for the right side three-axis toggle.

6. The compound toggle submechanism of claim 1, wherein the three-axis toggles include a left side three-axis toggle coupled to a left side coupling toggle and a left side bar toggle such that the left side coupling toggle and a portion of the left side bar toggle each rotate about a left side fixed point when the drive shaft rotates, and a right side three-axis toggle coupled to a right side coupling toggle and a right side bar toggle such that the right side coupling toggle and a portion of the right side bar toggle each rotate about a right side fixed point when the drive shaft rotates.

7. The compound toggle submechanism of claim 6, further comprising a base plate rigidly coupled to a frame of the compound toggle system, the base plate including a left side opening corresponding to the left side fixed point and a right side opening corresponding to the right side fixed point.

8. The compound toggle submechanism of claim 1, wherein the bar toggles include a left side bar toggle configured to rotate about a left side opening of the object connector when the drive shaft rotates, and a right side bar toggle configured to rotate about a right side opening of the object connector when the drive shaft rotates.

9. A compound toggle submechanism for use with a compound toggle system to apply a force to an external object, the compound toggle submechanism comprising:

a crank bar rigidly coupled to a drive shaft of the compound toggle system and configured to rotate when the drive shaft rotates, the crank bar including a left side lobe and a right side lobe, each side lobe configured to rotate about the drive shaft;

a left side pull bar coupled to the left side lobe, a portion of the left side pull bar configured to rotate about the drive shaft;

a right side pull bar coupled to the right side lobe, a portion of the right side pull bar configured to rotate about the drive shaft;

a left side linear toggle coupled to the left side pull bar, the left side linear toggle configured to move linearly when the drive shaft rotates;

a right side linear toggle coupled to the right side pull bar, the right side linear toggle configured to move linearly when the drive shaft rotates;

a left side coupling toggle coupled to the left side linear toggle, the left side coupling toggle configured to rotate and move when the drive shaft rotates;

a right side coupling toggle coupled to the right side linear toggle, the right side coupling toggle configured to rotate and move when the drive shaft rotates;

a left side three-axis toggle coupled to the left side coupling toggle, the left side three-axis toggle configured to rotate about a left side fixed point when the drive shaft rotates;

a right side three-axis toggle coupled to the right side coupling toggle, the right side three-axis toggle configured to rotate about a right side fixed point when the drive shaft rotates;

a left side bar toggle coupled to the left side three-axis toggle, the left side bar toggle configured to rotate about an upper opening on the left side three-axis toggle when the drive shaft rotates;

a right side bar toggle coupled to the right side three-axis toggle, the right side bar toggle configured to rotate about an upper opening on the right side three-axis toggle when the drive shaft rotates; and an object connector coupled to the left side bar toggle and the right side bar toggle, the object connector configured to connect to the external object and to move in a vertical direction when the drive shaft rotates.

10. The compound toggle submechanism of claim 9, wherein a portion of one of the left side pull bar or the right side pull bar is configured to move above the drive shaft when the drive shaft rotates and a portion of the other of the left side pull bar or the right side pull bar is configured to move below the drive shaft when the drive shaft rotates.

11. The compound toggle submechanism of claim 10, wherein the left side pull bar includes a first concave portion and the right side pull bar includes a second concave portion and the first concave portion and the second concave portion are each positioned adjacent to the drive shaft when the drive shaft rotates in a first direction.

12. The compound toggle submechanism of claim 9, wherein the left side linear toggle is configured to slide on a left side linear toggle rail when the drive shaft rotates, and the right side linear toggle is configured to slide on a right side linear toggle rail when the drive shaft rotates.

13. The compound toggle submechanism of claim 9, wherein the left side coupling toggle is configured to convert the linear motion of the left side linear toggle into rotational motion for the left side three-axis toggle, and the right side coupling toggle is configured to convert the linear motion of the right side linear toggle into rotational motion for the right side three-axis toggle.

14. The compound toggle submechanism of claim 9, wherein the left side coupling toggle and a portion of the left side bar toggle each rotate about the left side fixed point when the drive shaft rotates, and the right side coupling toggle and a portion of the right side bar toggle each rotate about the right side fixed point when the drive shaft rotates.

15. The compound toggle submechanism of claim 14, further comprising a base plate rigidly coupled to a frame of the compound toggle system, the base plate including a left side opening corresponding to the left side fixed point and a right side opening corresponding to the right side fixed point.

16. The compound toggle submechanism of claim 9, wherein the left side bar toggle configured to rotate about a left side opening of the object connector when the drive shaft rotates and the right side bar toggle configured to rotate about a right side opening of the object connector when the drive shaft rotates.

17. A compound toggle submechanism for use with a compound toggle system to apply a force to an external object, the compound toggle submechanism comprising:

a crank bar rigidly coupled to a drive shaft of the compound toggle system and configured to rotate when the drive shaft rotates, the crank bar including a left side lobe and a right side lobe, each side lobe configured to rotate about the drive shaft;

a left side pull bar coupled to the left side lobe, a portion of the left side pull bar configured to rotate about the drive shaft and move above or below the drive shaft;

a right side pull bar coupled to the right side lobe, a portion of the right side pull bar configured to rotate about the drive shaft and move above or below the drive shaft;

a left side linear toggle coupled to the left side pull bar, the left side linear toggle configured to move linearly along a left side toggle rail when the drive shaft rotates;

a right side linear toggle coupled to the right side pull bar, the right side linear toggle configured to move linearly along a right side toggle rail when the drive shaft rotates;

a left side coupling toggle coupled to the left side linear toggle, the left side coupling toggle configured to rotate and move when the drive shaft rotates;

a right side coupling toggle coupled to the right side linear toggle, the right side coupling toggle configured to rotate and move when the drive shaft rotates;

a left side three-axis toggle coupled to the left side coupling toggle, the left side three-axis toggle configured to rotate about a left side fixed point when the drive shaft rotates;

a right side three-axis toggle coupled to the right side coupling toggle, the right side three-axis toggle configured to rotate about a right side fixed point when the drive shaft rotates;

a base plate rigidly coupled to a frame of the compound toggle system, the base plate including a left side opening corresponding to the left side fixed point and a right side opening corresponding to the right side fixed point;

a left side bar toggle coupled to the left side three-axis toggle, the left side bar toggle configured to rotate about an upper opening on the left side three-axis toggle when the drive shaft rotates;

a right side bar toggle coupled to the right side three-axis toggle, the right side bar toggle configured to rotate about an upper opening on the right side three-axis toggle when the drive shaft rotates; and an object connector coupled to the left side bar toggle and the right side bar toggle, the object connector configured to connect to the external object and to move in a vertical direction when the drive shaft rotates.

18. The compound toggle submechanism of claim 17, wherein the left side coupling toggle is configured to convert the linear motion of the left side linear toggle into rotational motion for the left side three-axis toggle, and the right side coupling toggle is configured to convert the linear motion of the right side linear toggle into rotational motion for the right side three-axis toggle.

19. The compound toggle submechanism of claim 17, wherein the left side coupling toggle and a portion of the left side bar toggle each rotate about the left side fixed point when the drive shaft rotates, and the right side coupling toggle and a portion of the right side bar toggle each rotate about the right side fixed point when the drive shaft rotates.

20. The compound toggle submechanism of claim 17, wherein the left side bar toggle configured to rotate about a left side opening of the object connector when the drive shaft rotates and the right side bar toggle configured to rotate about a right side opening of the object connector when the drive shaft rotates.

* * * * *